United States Patent
Peled et al.

(10) Patent No.: US 8,530,365 B2
(45) Date of Patent: Sep. 10, 2013

(54) COMPOSITION FOR IMPROVING THE STABILITY AND OPERATIONAL PERFORMANCE AND REDUCING THE ENVIRONMENTAL IMPACT OF ASPHALT MIXES

(75) Inventors: Ronen Alexander Peled, Beer Sheva (IL); Andrey Vorobiev, Beer Sheva (IL); Gregory Svechinsky, Haifa (IL); Ilan Ishai, Ra'anana (IL)

(73) Assignee: DSI-Dimona Silica Industries Ltd., Dimona (IL)

( * ) Notice: Subject to any disclaimer, the term of this patent is extended or adjusted under 35 U.S.C. 154(b) by 0 days.

(21) Appl. No.: 12/721,807

(22) Filed: Mar. 11, 2010

(65) Prior Publication Data

US 2010/0255982 A1   Oct. 7, 2010

Related U.S. Application Data

(60) Provisional application No. 61/167,169, filed on Apr. 7, 2009.

(51) Int. Cl.
*C04B 33/00* (2006.01)
*C08L 95/00* (2006.01)
*C09D 4/00* (2006.01)
*C09D 101/00* (2006.01)
*C09D 201/00* (2006.01)

(52) U.S. Cl.
USPC ........................................ 501/141; 106/273.1

(58) Field of Classification Search
USPC ........................................ 501/141; 106/273.1
See application file for complete search history.

(56) References Cited

U.S. PATENT DOCUMENTS

| | | | | |
|---|---|---|---|---|
| 2,663,650 | A | * 12/1953 | Iler | ............................. 106/491 |
| 3,721,578 | A | 3/1973 | Bennett et al. | |
| 3,916,058 | A | * 10/1975 | Vossos | ...................... 427/389.9 |
| 4,410,589 | A | 10/1983 | Muller et al. | |
| 5,073,198 | A | * 12/1991 | Kurz | ............................ 106/791 |
| 5,102,837 | A | * 4/1992 | Balkany et al. | ............... 501/141 |
| 5,217,530 | A | 6/1993 | Grzybowski | |
| 5,445,804 | A | * 8/1995 | Iosef | ............................ 423/339 |
| 5,711,796 | A | 1/1998 | Grzybowski et al. | |

(Continued)

FOREIGN PATENT DOCUMENTS

| | | | |
|---|---|---|---|
| CN | 101205135 A | * | 6/2008 |
| RU | 2182136 C2 | | 5/2010 |

(Continued)

OTHER PUBLICATIONS

Nesichi, S. & Ishai, I. "A Modified Method for Predicting Reduced Asphaltic Pavement Life from Moisture Damage" Asphalt Paving Technology, vol. 55, 1986, pp. 149-174.

(Continued)

*Primary Examiner* — Shuangyi Abu Ali
(74) *Attorney, Agent, or Firm* — Sughrue Mion, PLLC

(57) ABSTRACT

A composition useful as an additive for asphalt mixes, such as stone matrix asphalt and porous asphalt, comprising the mineral porcelanite and either an activating agent or amorphous silica, and asphalt mixes comprising the composition. The asphalt mixes are stable and meet performance requirements according to national standards. The asphalt mixes require less bitumen than fiber-stabilized mixes, and can be mixed for less time at a lower temperature. The asphalt mixes comprising the inventive composition are thus more economical and environmentally friendly than existing asphalt mixes.

25 Claims, 1 Drawing Sheet

(56) References Cited

U.S. PATENT DOCUMENTS

| | | | |
|---|---|---|---|
| 5,827,568 | A | 10/1998 | Wickett |
| 6,156,828 | A | 12/2000 | Wickett |
| 6,562,118 | B2 | 5/2003 | Hagens |
| 6,758,892 | B2 | 7/2004 | Muniandy |
| 6,982,049 | B1 * | 1/2006 | Mabey et al. ............... 252/606 |
| 7,241,337 | B1 | 7/2007 | Bardine et al. |
| 7,297,204 | B2 | 11/2007 | Crews et al. |
| 7,335,251 | B2 | 2/2008 | Dupuis et al. |
| 2001/0047738 | A1 | 12/2001 | Hagens |
| 2002/0108534 | A1 | 8/2002 | Muniandy |
| 2003/0181557 | A1 | 9/2003 | Suzuki et al. |
| 2004/0101365 | A1 | 5/2004 | Larsen |
| 2006/0169173 | A1 * | 8/2006 | Dupuis et al. ............. 106/281.1 |
| 2007/0104923 | A1 * | 5/2007 | Whitaker et al. ............ 428/144 |
| 2008/0060551 | A1 | 3/2008 | Crews et al. |
| 2008/0168926 | A1 | 7/2008 | Muller et al. |
| 2008/0224345 | A1 | 9/2008 | Fox |
| 2008/0271639 | A1 | 11/2008 | Partanen et al. |
| 2009/0061236 | A1 | 3/2009 | Walther et al. |
| 2009/0105376 | A1 | 4/2009 | Korenstra et al. |
| 2010/0022686 | A1 | 1/2010 | Partanen et al. |

FOREIGN PATENT DOCUMENTS

| | | | |
|---|---|---|---|
| SU | 1018652 A | * | 5/1983 |
| WO | WO 2005/100479 | | 10/2005 |
| WO | WO 2010/116354 | | 10/2010 |

OTHER PUBLICATIONS

Ishai, I. & Nesichi, S. "Laboratory Evaluation of Moisture Damage of Bituminous Paving Mixtures by Long-Term Hot Immersion." Transportation Research Record No. 1171, 1988, pp. 12-17.

E.R. Brown, et al., "Evaluation of Laboratory Properties of SMA Mixtures", National Center for Asphalt Technology, NCAT Oct. 1993.

An International Search Report and a Written Opinion both dated Nov. 3, 2010, which issued during the prosecution of Applicant's PCT/IL10/00210.

An Office Action dated Apr. 25, 2012, which issued during the prosecution of Eurasian Patent Application No. 201190245.

Yariv, "Organo-Clay Complexes and Interactions", Dekker: New York, 2002, pp. 84-86.

Israel Office Action for corresponding IL Patent Application No. 204445 dated Apr. 25, 2013.

* cited by examiner

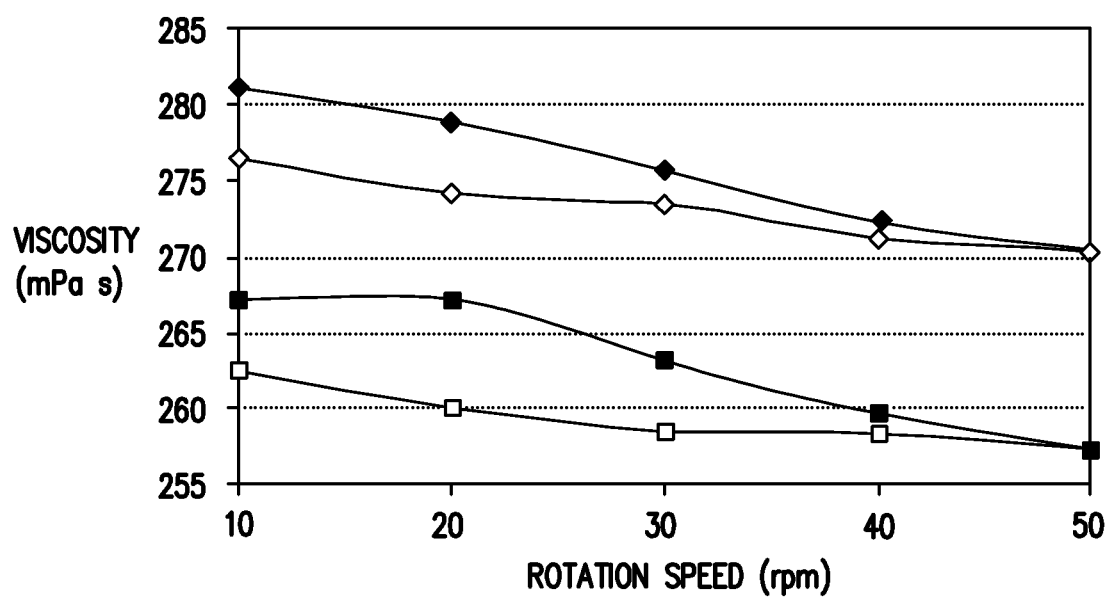

COMPOSITION FOR IMPROVING THE STABILITY AND OPERATIONAL PERFORMANCE AND REDUCING THE ENVIRONMENTAL IMPACT OF ASPHALT MIXES

CROSS-REFERENCE TO RELATED APPLICATIONS

Reference is made to U.S. Provisional Patent Application Ser. No. 61/167,169, filed Apr. 7, 2009 and entitled ADVANCED ASPHALT COMPOSITIONS AND THE PROCESS FOR PRODUCING THEM, the disclosure of which is hereby incorporated by reference and priority of which is hereby claimed pursuant to 37 CFR 1.78(a)(4) and (5)(i).

FIELD OF THE INVENTION

The present invention relates to compositions for stabilizing and improving modern asphalt mixes including stone matrix asphalt.

BACKGROUND OF THE INVENTION

The following documents are believed to represent the current state of the art:

U.S. Pat. Nos. 5,217,530; 5,711,796; 5,827,568; 6,156,828; 6,562,118; 6,758,892; 7,241,337; 7,297,204;

U.S. Patent Publication Nos. 2001/0047738; 2002/0108534; 2004/0101365; 2008/0060551; 2008/0168926; 2008/0224345; 2008/0271639; 2009/0061236; 2009/0105376; 2010/0022686;

Published PCT Application: WO 2005/100479.

SUMMARY OF THE INVENTION

The present invention seeks to provide improved asphalt mixes that are stable and have improved performance and environmental impact as compared to existing asphalt mixes.

There is thus provided in accordance with a preferred embodiment of the present invention a composition useful as an additive for asphalt mixes including porcelanite and an activating agent. Preferably, the activating agent includes a quaternary ammonium compound.

In accordance with a preferred embodiment of the present invention, the quaternary ammonium compound includes at least two long alkyl chains of 10-30 carbons. Preferably, the long alkyl chains have 15-18 carbons. Most preferably, the quaternary ammonium compound is di(hydrogenated tallow) dimethylammonium chloride.

Preferably, the quaternary ammonium compound is present in an amount of 1-15% of the porcelanite weight, more preferably 1-10% of the porcelanite weight.

There is also provided in accordance with another preferred embodiment of the present invention a composition useful as an additive for asphalt mixes comprising porcelanite and amorphous silica. Preferably, the ratio of porcelanite to amorphous silica is from 1:100 to 100:1, more preferably from 1:10 to 10:1, most preferably 1:1.

Preferably, the compositions are provided in the form of a powder. The powder preferably has a particle size of less than 40 microns.

There is also provided in accordance with a further preferred embodiment of the present invention an asphalt mix including aggregates, bitumen and an additive, wherein the additive comprises at least one of activated porcelanite and amorphous silica. In one preferred embodiment, the additive consists of amorphous silica.

In accordance with another preferred embodiment, the additive includes the aforementioned composition including porcelanite and amorphous silica. In accordance with a further embodiment, the additive includes the aforementioned composition including porcelanite and an activating agent.

Preferably, the asphalt mix includes 0.2-0.8% additive by weight, based on 100% dry aggregate weight. More preferably, the asphalt mix includes 0.4% additive.

In accordance with a preferred embodiment of the present invention, the asphalt mix includes 4.5-6.5% bitumen by weight, based on 100% dry aggregate weight, more preferably 5.0-6.0% bitumen. Preferably, the bitumen is graded PG 70-10 or PG 76-10, according to Israel Standard 161 Part 1.

Preferably, the asphalt mix is stone matrix asphalt (SMA). In an alternative preferred embodiment, the asphalt mix is porous asphalt.

Preferably, the drain-down of bitumen from the asphalt mix is less than 0.1%. Preferably, the retained Marshall stability of the asphalt mix after 24 hours is at least 100%.

There is also provided in accordance with a preferred embodiment of the present invention, a method of providing an asphalt mix, including drying aggregate particles, mixing an additive into the aggregate particles, adding bitumen to the aggregate particles, and mixing to form a homogenous asphalt mix, wherein the additive is selected from activated porcelanite and amorphous silica.

Preferably, the additive is added to the aggregate particles before the bitumen. Preferably, the additive is mixed with the aggregate for about 10 seconds before the bitumen is added. In an alternative embodiment, the bitumen is added to the aggregate particles before the additive.

In accordance with a preferred embodiment of the present invention, the total mixing time is about 20-100 seconds, more preferably about 60-80 seconds. Preferably, the mixing temperature is about 140-170° C., more preferably about 160-165° C.

Preferably, the drain-down of bitumen from the asphalt mix produced by the method is less than 0.1%. Preferably, the retained Marshall stability of the asphalt mix after 24 hours is at least 100%.

In accordance with one preferred embodiment, the method is carried out in a batch process. In an alternative embodiment, the method is carried out in a continuous process.

BRIEF DESCRIPTION OF THE DRAWINGS

The present invention will be understood and appreciated more fully from the following detailed description, taken in conjunction with the drawing in which:

FIG. 1 is a graph of the rheological properties of mixtures of bitumen and activated porcelanite useful in accordance with one embodiment of the present invention.

DETAILED DESCRIPTION OF THE INVENTION

Asphalt paving mixes comprise mineral aggregates, bitumen (sometimes referred to as "asphalt") to bind the aggregates and optional additives. Traditional dense graded asphalt mixes, also called asphalt concrete or hot-mix asphalt (HMA), comprise about 5% bitumen and about 95% aggregates.

Special advanced surface asphalt mixes are a new family of asphalt mixes for paving applications. This family of special advanced surface asphalt mixes includes porous asphalt mix and Stone Matrix Asphalt mix (SMA). Porous asphalt mix (also called "silent asphalt" or "drainage asphalt") comprises large and small aggregate particles with no medium size particles.

SMA, also referred to as Stone Mastic, Split Mastic, Grit Mastic, or Stone Filled Asphalt, was originally developed to provide a mixture that offered maximum resistance to studded tire wear. This resistance was achieved by using a higher proportion of large aggregate particles, leading to interlocking and direct stone-to-stone contact. SMA is described in detail in NCAT Report 93-05, "Evaluation of laboratory properties of SMA mixtures", National Center of Asphalt Technology, Auburn University, 1993, incorporated by reference herein in its entirety.

SMA has also been shown to provide high resistance to plastic deformation under heavy traffic loads with high tire pressures as well as good low temperature properties. Additionally, SMA has a rough surface texture which provides good friction properties after the surface film of bitumen is removed by traffic. Other essential features that make SMA desirable over traditional dense HMA are increased durability, improved aging properties, reduced traffic noise and reduction or prevention of runoff of storm water on pavement surfaces.

Advanced asphalt mixes, especially Silent Asphalt and SMA suffer from drain-down of bitumen from the asphalt mix after production and during transport and storage. This phenomenon makes it impossible to use these mixes without stabilization. The usual method of stabilization is the addition of filaments, usually cellulose or mineral fibers to the mix. Polymer fibers can also be used for this purpose. The usual content of fibers in asphalt mixes is between 0.3-0.5 percent based on 100% dry aggregate weight.

While fiber stabilization provides a suitable level of drain-down of bitumen (less than 0.1%), it also causes a decline in the mixing properties. The required mixing time for fiber-stabilized mixes is about 2 minutes, as opposed to the 1 minute mixing time required for traditional HMA. Additionally, a higher mixing temperature relative to traditional asphalt mixes is required because of the increase in compaction resistance of the filament-filled asphalt mix. Finally, the bitumen content must be increased from about 5% in traditional HMA to about 7-10% in order to provide proper coating of the fibers as well as the aggregate particles.

All of these disadvantages add to the cost of asphalt production. Longer mixing time slows production, and the higher temperatures required increase energy consumption. Bitumen is the most expensive component of asphalt mixes, and the increased proportion of bitumen in SMA increases the cost considerably.

Additionally, the production parameters required by the use of fibers cause a burden on the environment. Maintaining higher temperatures for longer periods of time leads to an increase in energy consumption and greenhouse gas emissions. Extra bitumen must be obtained, which is an energy consuming process. The cellulose fibers themselves require consumption of trees and processing thereof.

A first embodiment of the invention is a composition useful as an additive for asphalt mixes, such as SMA, porous asphalt and gap-graded asphalt. In one embodiment, the composition comprises porcelanite, a mineral found, inter alia, in deposits in the Dead Sea area of Israel, and an activating agent. In one preferred embodiment, the activating agent is a quaternary ammonium compound.

The quaternary ammonium compound preferably has at least two long carbon chains. The long carbon chains preferably comprise between 10 and 30 carbon atoms, more preferably from 15 to 18 carbon atoms. An especially preferred compound is di(hydrogenated tallow)dimethylammonium chloride, available from AkzoNobel (Stockholm, Sweden) as Arquad 2HT-75 (hereinafter "2HT-75").

Porcelanite is described in detail in The Geological Survey of Israel Report GSI/11/04, as follows: porcelanite is a sedimentary rock comprising mainly opal (hydrated silica). Opal is an amorphous mineral of silica including varying amounts of water (usually 3-9%, but can reach as high as 20%). In porcelanite, the opal is of the CT type, comprising crystallographically unordered α-cristobalite and α-tridymite. In addition to silica, porcelanite comprises other components such as carbonates, phosphates, quartz, halite, gypsum and organic materials.

A typical chemical composition of porcelanite is: $SiO_2$—65%; $\{CaCO_3, MgCO_3, CaMg(CO_3)_2\}$—12%; alumosilicates—5%; $\{Na(SO_4)_2, CaSO_4\}$—4%; components including moisture—14%. The porcelanite can be thermally treated at 600-700° C. to remove small quantities of organic impurities. Preferably, the porcelanite is used without thermal treatment.

Activation of the porcelanite is preferably achieved by crushing the porcelanite to about 3-8 mm particle size granules, adding the activating agent, and blending the mixture until the desired particle size is achieved. In other words, the porcelanite is raw and unpurified before mixing with the activating agent. Alternatively, the porcelanite can be blended for about 5 minutes, followed by addition of the activating agent and further blending for an additional 3-5 minutes.

The weight of the quaternary ammonium compound is preferably between 1 and 15% of the porcelanite weight. More preferably, the weight of the quaternary ammonium compound in the composition is between 1 and 10% of the porcelanite weight.

In an alternative embodiment, the additive composition comprises unactivated porcelanite and amorphous silica. The weight ratio of porcelanite to amorphous silica in the composition is preferably from 1:100 to 100:1, such as 1:10 to 10:1, more preferably 1:2 to 2:1, most preferably 1:1.

The composition of the invention is preferably provided as a powder. The particle size of the powder is preferably less than 40 μm. When the composition comprises amorphous silica, the silica preferably has a particle size of about 1-10 μm. The composition imparts thixotropic and pseudoplastic properties to asphalt mixes and thus allows for decreasing the mixing time and working temperature during the mixing, laying and compacting of asphalt mixes as compared to asphalt mixes modified with fibers.

A further embodiment of the invention is an asphalt mix comprising aggregates, bitumen and an additive composition. The aggregate maximum size is preferably 12.5 mm (0.5 in) but other maximum sizes, such as 19 mm (0.75 in) and 9.5 mm (0.375 in) can also be used. In one embodiment, the aggregate gradation is in accordance with Israel Standard 362, part 1, shown in Table 1. In an alternative embodiment, the aggregate gradation conforms to the European Standard EN 13108-5, also shown in Table 1.

TABLE 1

| | Aggregate gradation, % passing sieve | | | | | | |
|---|---|---|---|---|---|---|---|
| Sieve size | ½" | ⅜" | 5/16" | #4 | #10 | #40 | #200 |
| Sieve size (mm) | 12.5 | 9.5 | 8 | 4.75 | 2 | 0.44 | 0.075 |
| Israel Standard 362 Requirements | 100 | 90-95 | 80-90 | 20-30 | 15-25 | | 7-11 |

TABLE 1-continued

| Aggregate gradation, % passing sieve | | | | | | | |
|---|---|---|---|---|---|---|---|
| Sieve size | ½" | ⅜" | ⁵⁄₁₆" | #4 | #10 | #40 | #200 |
| EN 13108 - 5 requirements | 100 | | 61 | 38 | 27 | 18 | 8 |

The bitumen may be performance grade (PG) bitumen, such as PG 70-10 or PG 76-10, according Israel Standard 161, Part 1. In this standard, the first number in the bitumen grade refers to the maximum pavement temperature (° C.), and the second number refers to the minimum pavement temperature (° C.). For example, PG 70-10 is appropriate for roads that reach a maximum temperature of 70° C. and a minimum temperature of −10° C.

In one preferred embodiment, the additive composition is the activated porcelanite composition as described hereinabove. In an alternative embodiment, the additive composition is the composition comprising unactivated porcelanite and amorphous silica, described hereinabove. In a further embodiment, the additive composition consists of amorphous silica.

Preferably the asphalt mix comprises 4.5-6.5% bitumen, more preferably 5.0-6.0%, most preferably about 5.8% (based on 100% dry aggregate weight). The asphalt mix also contains about 0.2-0.8% of the additive composition, preferably 0.4-0.6%, most preferably 0.4%.

Asphalt mixes of the present invention are preferably prepared as follows: aggregates are dried for about 16 hours at 170° C. Then, the aggregates are mixed with the additive composition at 140-170° C., more preferably from 160-165° C., for about 10 sec followed by addition of hot bitumen. The asphalt mix is then mixed for an additional 20-100 sec, preferably 60-80 sec. Alternatively, hot bitumen can be poured into the dried aggregates followed by addition of the additive composition.

The asphalt mixes of the present invention can be prepared in a batch or continuous process. After production, the hot asphalt mixes can be loaded into trucks for delivery to a worksite, or stored in a hot storage facility.

An additional embodiment of the invention is a method of providing an asphalt mix, such as SMA, porous asphalt and gap-graded asphalt, comprising mixing aggregates, bitumen and an additive, wherein the additive comprises the activated porcelanite composition described hereinabove or amorphous silica. The additive is preferably added in an amount of about 0.2-0.8% based on 100% dry aggregate weight, more preferably 0.4-0.6%, most preferably 0.4%.

In one embodiment, the additive is the activated porcelanite composition as described hereinabove. In an alternative embodiment, the additive is the composition comprising unactivated porcelanite and amorphous silica, described hereinabove. In a further embodiment, the additive consists of amorphous silica.

EXAMPLES

Example 1

The rheological properties of mixtures of bitumen and activated porcelanite were measured at 160° C. Measurements were made using a Brookfield Rheometer DV-III Ultra with Thermosel system controlled by computer.

Viscosity measurements were conducted on samples of bitumen mixed with porcelanite activated with 2HT-75 after heating for 2 and 4 hours, respectively, at 160° C. The results are shown in FIG. 1 for samples heated for 2 hours (diamonds) and 4 hours (squares). The results for increasing rotation speed are shown with filled symbols, while the results for decreasing rotation speed are shown with empty symbols.

It can be seen from FIG. 1 that porcelanite activated with 2HT-75 imparts thixotropic and pseudoplastic properties to bitumen. These thixotropic and pseudoplastic properties provide an asphalt mix that is workable and easy to mix when hot, but is stable both during transport and once it is laid and cooled on the road.

Example 2

A laboratory test analysis was performed to compare identical SMA mixtures containing activated porcelanite with mixtures containing cellulose fibers.

All samples of asphalt mixes were prepared and tested in the Asphalt Laboratory of the Standards Institution of Israel (Jerusalem, Israel) and according to the Marshall Method of Design and Testing of Asphalt Mixes, described in Manual MS-2 "Mix Design Methods" of the Asphalt Institute (Lexington, Ky., USA), incorporated herein by reference in its entirety.

Preparation of Samples:

European-American SMA Mix, with 3% air voids, that conforms to Standard EN 13108-5, described in Table 1 above, was collected from an asphalt plant. Bitumen was graded as PG 70-10, according Israel Standard 161, Part 1. Cellulose fibers for comparative tests complied with Israel Specification 51.04.

Samples of the activated porcelanite composition were prepared as follows: 100 g of crushed porcelanite with a particle size between 3 and 8 mm was mixed with 5 g of 2HT-75 in a laboratory blender at 20,000 RPM for 5 minutes. The particle size distribution was measured by Malvern Mastersizer 2000. Maximum particle size was 40 μm.

All preparations for asphalt mixes were conducted by procedures described in Manual MS-2, referenced hereinabove. The aggregate mix was heated and dried for 16 hours in a drying oven at 170° C. After this heating period, portions of aggregate mix were taken for preparation of asphalt mixes.

All asphalt mixes were prepared with the same bitumen content (5.8% based on 100% of dry aggregate weight) and with the same content of cellulose fibers or activated porcelanite (0.4% based on 100% of dry aggregate weight).

Asphalt mixes with cellulose fibers were prepared as follows: aggregates and fibers were mixed together at 165° C. for 1 minute. Afterwards, hot bitumen graded as PG-70-10 was added to the mix of aggregates and fibers, and all of the components were mixed together at 165° C. for an additional 1 minute. A homogenous asphalt mix was obtained.

Asphalt mixes with activated porcelanite were prepared as follows: aggregates and activate porcelanite were mixed together at 165° C. for 10 seconds, and hot bitumen graded as PG 70-10 was poured into the mixer. A visually homogenous mix was obtained after only 20 seconds of mixing all ingredients together.

The preparation of samples and measuring of their properties were conducted according to the "Marshall Method" described in the aforementioned Manual MS-2 and in Standard ASTM D 1559. The Marshall Method is a quantitative engineering tool for designing hot asphalt mixes by determining the optimal bitumen content in the mix, for a given type of aggregate and gradation and bitumen type, under specified road and traffic characteristics.

Compacted cylindrical specimens of asphalt mixes were produced following the mixing. The compaction procedure was performed by the Marshall Hammer Compaction Method (Reynolds model). The compacting procedure was conducted as follows: 1200 g of hot asphalt mix was weighed and poured into a metal mold cylinder with inner diameter 102 mm, the mold cylinder was installed on the base of a Marshall Hammer and compacted with 50 blows of a 4.5 kg hammer from both sides of the specimens. Compaction temperature was 145° C.

The compacted specimens were immersed in a thermostatic water bath at 60° C. for periods of 0.5, 24, 168 and 336 hours. For each measurement point three specimens were prepared. The Marshall Stability, the maximal force the specimen can sustain, was measured using a Marshall Testing Machine.

Specimens measured after heating for half an hour in water maintained the original Marshall Stability. Stability of specimens measured after longer hot water immersion times (24, 168, 336 hours) is given as percentage of retained stability relative to original stability, as described in Nesichi, S. & Ishai, I. "A Modified Method for Predicting Reduced Asphaltic Pavement Life from Moisture Damage" Asphalt Paving Technology, Vol. 55, 1986, pp. 149-174, and Ishai, I. & Nesichi, S. "Laboratory Evaluation of Moisture Damage of Bituminous Paving Mixtures by Long-Term Hot Immersion." Transportation Research Record No. 1171, 1988, pp. 12-17, both incorporated herein by reference. The results are presented in Table 2.

TABLE 2

Asphalt mix properties measured according Marshall Method.

| Parameter | Requirements Israel | Requirements USA | Additive Cellulose fibers | Additive Activated porcelanite |
|---|---|---|---|---|
| Additive Concentration (in % relative to bitumen content) | | | 6.9 | 6.9 |
| Marshall Stability (lbs) | min 1500 | min 1500 | 1867 | 2033 |
| 24 h Retained Stability | min 80% | — | 86% | 100% |
| 168 h Retained Stability | — | — | 85% | 87% |
| 336 h Retained Stability | — | — | 85% | 88% |

It is clearly seen from Table 2, that the samples containing activated porcelanite had full Retained Marshall Stability after 24 hours. Additionally, the Retained Marshall Stability of the samples containing activated porcelanite meets specification requirements and was higher than the samples containing cellulose fibers for all tested treatment times, i.e. up to two weeks in hot water.

Table 3 presents the results of the tests of drain-down properties in accordance with two different standard procedures, described in Standards ASTM D 6390 and BS EN 12697-18, Test Method A. The maximum drain-down requirement for Israel is 0.1%, for U.S.A. 0.3%, and for Europe 0.6%.

Test temperature was 185° C. for samples containing cellulose fibers and 160° C. for samples containing activated porcelanite. Heating time was 1 hour for ASTM D 6390 and 3 hours for BS EN 12697-18. Total drain-down after separation is the drain-down of only bitumen after separation of aggregates.

TABLE 3

Results of drain-down tests

| Additive | Activated porcelanite | | | Cellulose fibers | |
|---|---|---|---|---|---|
| Maximum particle size (μm) | 40 | 40 | 40 | | |
| Stabilizer content | 0.35% | 0.40% | 0.40% | 0.40% | 0.40% |
| Bitumen content | 6.00% | 5.90% | 5.90% | 5.90% | 5.90% |
| Standard | Total drain-down after separation | | | | |
| ASTM D 6390 | 0.08% | 0.04% | 0.03% | 0.07% | 0.01% |
| BS EN 12697 - 18 | 0.02% | 0.01% | 0.00% | 0.00% | 0.02% |

From Table 3 it is seen that drain-down of bitumen from asphalt mixes containing activated porcelanite, tested in accordance with two different standard procedures, meet the corresponding standards requirements, including Israel standard requirements, which are the strictest.

Example 3

A laboratory test analysis was performed to compare identical SMA mixtures containing activated porcelanite with mixtures containing cellulose fibers.

All samples of asphalt mixes were prepared and tested in the Asphalt Laboratory of the Standards Institution of Israel (Jerusalem, Israel) according the Marshall Method of Design and Testing of Asphalt Mixes, described in the aforementioned manual MS-2. Samples were prepared as described in Example 2, except that the mixing temperature was 140° C., and the amount of additive (activated porcelanite or cellulose fibers) was 0.3%. The amount of bitumen varied from sample to sample as described below.

The results for the mix comprising activated porcelanite mix and the mix comprising cellulose fibers are shown in Tables 4 and 5, respectively. All measurements were conducted according to the following standards and specifications:

ascertaining theoretical maximum density according to ASTM D 2041;

ascertaining density of compacted specimens according to ASTM D 2726;

ascertaining Marshall Stability and Marshall Flow, the deformation of the specimen at the Marshall Stability, according to ASTM D 1559;

ascertaining air voids in mix and voids in mineral aggregate (VMA) according to ASTM D 2726 at room temperature; and ascertaining bitumen content by the cold extraction method according to ASTM D 2172.

TABLE 4

Properties of asphalt mix comprising activated porcelanite

| Bitumen Content (%) | 4.5 | 5 | 5.5 | 6 | 6.5 |
|---|---|---|---|---|---|
| Maximum Theoretical Density (kg/m$^3$) | 2572 | 2550 | 2531 | 2511 | 2499 |
| Density (kg/m$^3$) | 2456 | 2494 | 2503 | 2508 | 2498 |
| Marshall Stability (lbs) | 5051 | 3464 | 2862 | 2867 | 2486 |
| Marshall Flow (0.01") | 13.7 | 15.3 | 16 | 14.7 | 17.7 |
| Retained Marshall Stability after 24 h (%) | 89 | 97.1 | 99.8 | 84.6 | 96.7 |
| Air Voids in Mix (%) | 4.5 | 2.2 | 1.1 | 0.1 | 0 |
| VMA (%) | 15.3 | 14.5 | 14.6 | 14.9 | 15.7 |
| Bitumen Saturation (%) | 77.3 | 86.8 | 93 | 99.3 | 100 |
| Drain-Down (%) | 0 | 0.03 | 0.24 | 0.18 | 0.68 |

TABLE 5

Properties of asphalt mix comprising cellulose fibers

| Bitumen Content (%) | 5 | 5.5 | 6 | 6.5 | 7 |
|---|---|---|---|---|---|
| Maximum Theoretical Density (kg/m³) | 2561 | 2557 | 2527 | 2492 | 2473 |
| Density (kg/m³) | 2427 | 2446 | 2466 | 2482 | 2472 |
| Marshall Stability (lbs) | 3203 | 2572 | 2514 | 2205 | 2090 |
| Marshall Flow (0.01") | 13 | 12.3 | 14.7 | 20.7 | 22 |
| Retained Marshall Stability after 24 h (%) | 95 | 92.2 | 99.4 | 95.8 | 93.1 |
| Air Voids in Mix (%) | 5.2 | 4.3 | 2.4 | 0.4 | 0 |
| VMA (%) | 17.1 | 17.7 | 16.9 | 16.2 | 17 |
| Bitumen Saturation (%) | 76.7 | 80.5 | 87.6 | 97.6 | 100 |
| Drain-Down (%) | 0.02 | 0.02 | 0.04 | 0.07 | 0.09 |

From the results shown in Tables 4 and 5, the optimal bitumen content was calculated as described in the aforementioned manual, MS-2. The optimal bitumen content for mixes comprising activated porcelanite is 5%, while for mixes comprising cellulose fibers the optimal bitumen content is 5.9%. It is thus shown that the activated porcelanite provides the possibility of producing an asphalt mix with a lower bitumen content than mixes containing cellulose fibers, while still meeting the standard requirements. As stated hereinabove, lower bitumen content is advantageous from both an economic and environmental perspective.

Example 4

A laboratory test analysis was performed to compare identical SMA mixtures containing amorphous silica with mixtures containing cellulose fibers.

All samples of asphalt mixes were prepared and tested in the Asphalt Laboratory of the Standards Institution of Israel and according to the Marshall Method of Design and Testing of Asphalt Mixes, described in the aforementioned manual MS-2. The samples were prepared in the same manner as described in Example 2 above, except that the aggregate was according to Israel Standard 362, described in Table 1 above, and the additive was amorphous silica (0.4%) or a mixture of amorphous silica (0.2%) and unactivated porcelanite (0.2%). The results are shown in Table 6.

TABLE 6

Properties of asphalt mixes containing amorphous silica or fibers

| Additive | Cellulose Fibers | Amorphous Silica | Amorphous Silica and Porcelanite | Israel Requirements |
|---|---|---|---|---|
| Theoretical Maximum Density (kg/m³) | 2549 | 2554 | 2559 | |
| Bulk Density (kg/m³) | 2365 | 2376 | 2378 | |
| Air voids (%) | 7.2 | 7.3 | 7.1 | 7.0-7.5 |
| Marshall Stability (lbs) | 1867 | 2115 | 1761 | Min. 1500 |
| Retained Marshall Stability after 24 h (lbs) | 1855 | 2255 | 1782 | |
| Retained Marshall Stability after 24 h (%) | 99 | 106.6 | 101.2 | Min. 80 |
| Retained Marshall Stability after 168 h (lbs) | | | 1803 | |
| Retained Marshall Stability after 168 h (%) | | | 102.4 | |
| Drain-down (%) | 0.05 | 0.02 | 0.09 | Max. 0.1 |

From Table 6 it is seen that asphalt mixes that meet Israel Standards can be made using amorphous silica or a composition comprising porcelanite and amorphous silica as the additive in place of cellulose fibers. Pure amorphous silica is expensive, and it is therefore advantageous to be able to replace part of the silica with a raw mineral such as porcelanite.

It is especially noteworthy that the Marshall Stability actually increases after 24 hour and 168 hour treatment in hot water for mixes containing the porcelanite-silica composition. As stated hereinabove, such asphalt mixtures have shorter mixing times and lower working temperatures than traditional fiber-containing asphalt mixes, and are thus advantageous from an economic and environmental viewpoint.

It will be appreciated by persons skilled in the art that the present invention is not limited to what has been particularly shown and described hereinabove. Rather the scope of the present invention includes both combinations and subcombinations of various features described hereinabove as well as modifications thereof which would occur to a person of skill in the art upon reading the foregoing description and which are not in the prior art.

The invention claimed is:

1. A composition useful as an additive for asphalt mixes comprising:
   raw, crushed porcelanite; and
   a quaternary ammonium compound which is di(hydrogenated tallow)dimethylammonium chloride,
   wherein said quaternary ammonium compound is in an amount of at least 1% and less than 10% of the porcelanite weight.

2. The composition according to claim 1 in the form of a powder.

3. The composition according to claim 2 wherein said powder has a particle size of less than 40 microns.

4. An asphalt mix comprising:
   aggregates;
   bitumen; and
   an additive,
   wherein said additive comprises the composition of claim 1.

5. The asphalt mix according to claim 4 wherein said mix comprises 0.2-0.8% additive by weight, based on 100% dry aggregate weight.

6. The asphalt mix according to claim 5, wherein said mix comprises 0.4% additive.

7. The asphalt mix according to claim 4 wherein said mix comprises 4.5-6.5% bitumen by weight, based on 100% dry aggregate weight.

8. The asphalt mix according to claim 7, wherein said mix comprises 5.0-6.0% bitumen.

9. The asphalt mix according to claim 4 wherein said bitumen is graded PG 70-10 or PG 76-10, according to Israel Standard 161 Part 1.

10. The asphalt mix according to claim 4 wherein said mix is stone matrix asphalt (SMA).

11. The asphalt mix according to claim 4 wherein said mix is porous asphalt.

12. The asphalt mix according to claim 4 wherein the drain-down of bitumen is less than 0.1%.

13. The asphalt mix according to claim 4 wherein the retained Marshall stability after 24 hours is at least 100%.

14. A method of providing an asphalt mix, comprising:
drying aggregate particles;
mixing an additive into said aggregate particles;
adding bitumen to said aggregate particles; and
mixing to form a homogenous asphalt mix,
wherein said additive comprises the composition of claim 1.

15. The method according to claim 14 wherein said additive is added to said aggregate particles before said bitumen.

16. The method according to claim 15 wherein said additive is mixed with said aggregate for about 10 seconds before said bitumen is added.

17. The method according to claim 14 wherein said bitumen is added to said aggregate particles before said additive.

18. The method according to claim 14 wherein the total mixing time is about 20-100 seconds.

19. The method according to claim 18 wherein the total mixing time is about 60-80 seconds.

20. The method according to claim 14 wherein the mixing temperature is about 140-170° C.

21. The method according to claim 20 wherein the mixing temperature is about 160-165° C.

22. The method according to claim 14 wherein the drain-down of bitumen from the asphalt mix is less than 0.1%.

23. The method according to claim 14 wherein the retained Marshall stability of the asphalt mix after 24 hours is at least 100%.

24. The method according to claim 14 which is carried out in a batch process.

25. The method according to claim 14 which is carried out in a continuous process.

* * * * *